(12) United States Patent
Avila

(10) Patent No.: US 12,145,302 B2
(45) Date of Patent: Nov. 19, 2024

(54) METHOD FOR MANUFACTURING A BLOWN FILM WITH DETERMINATION OF THE PROFILE OF A CHARACTERISTIC PROPERTY OF THE FILM

(71) Applicant: ALEPH, La Motte-Servolex (FR)

(72) Inventor: Jean-Noël Avila, Chambery (FR)

(73) Assignee: ALEPH ( * ) Notice: Subject to any disclaimer, the term of this patent is extended or adjusted under 35 U.S.C. 154(b) by 438 days.

(21) Appl. No.: 17/777,177

(22) PCT Filed: Nov. 9, 2020

(86) PCT No.: PCT/EP2020/081488
§ 371 (c)(1),
(2) Date: May 16, 2022

(87) PCT Pub. No.: WO2021/104841
PCT Pub. Date: Jun. 3, 2021

(65) Prior Publication Data
US 2022/0388220 A1 Dec. 8, 2022

(30) Foreign Application Priority Data
Nov. 28, 2019 (FR) .................................. 1913386

(51) Int. Cl.
B29C 48/92 (2019.01)
B29C 48/00 (2019.01)
(Continued)

(52) U.S. Cl.
CPC .......... B29C 48/92 (2019.02); B29C 48/0018 (2019.02); B29C 48/08 (2019.02);
(Continued)

(58) Field of Classification Search
CPC .......... B29C 2948/92152; B29C 2948/92438; B29C 2948/92447; B29C 2948/92647;
(Continued)

(56) References Cited

U.S. PATENT DOCUMENTS 3,474,160 A 10/1969 Doering
4,510,389 A * 4/1985 Fumoto .............. G01B 11/0691
250/358.1
(Continued)

FOREIGN PATENT DOCUMENTS

CN 101954734 A 1/2011
EP 0307076 A2 3/1989
(Continued)

OTHER PUBLICATIONS

First Office Action, Chinese Application No. 02080081957.7, mailed Mar. 20, 2024, 11 pages.
(Continued)

Primary Examiner — Kyle R Quigley
(74) Attorney, Agent, or Firm — Ware, Fressola, Maguire & Barber LLP

(57) ABSTRACT

A method of manufacturing a blown film (F) comprising extruding it through a die (D), flattening the film with a folding angle that varies, measuring a transverse profile of a characteristic property of the blown film, which property is summed over two juxtaposed portions of a wall of the flattened film, and estimating a polar profile on the basis of said transverse profile, the method further comprising determining polar positions of the periphery of the flattened blown film that correspond to a transverse position of the film, determining discretized angle values flanking each of the polar positions, and, on the basis of said discretized angle values, computing interpolation coefficients that associate the polar profile of the film with a discretized polar profile
(Continued)

of the film, and, based on said interpolation coefficients, updating the estimation of the discretized polar profile of the film by applying a Kalman filter.

14 Claims, 6 Drawing Sheets

(51) Int. Cl.
 *B29C 48/08* (2019.01)
 *B29C 55/28* (2006.01)
(52) U.S. Cl.
 CPC .... *B29C 55/28* (2013.01); *B29C 2948/92152* (2019.02); *B29C 2948/92438* (2019.02); *B29C 2948/92447* (2019.02); *B29C 2948/92647* (2019.02)
(58) Field of Classification Search
 CPC ..... B29C 48/0018; B29C 48/08; B29C 48/10; B29C 48/32; B29C 48/92; B29C 55/28
 See application file for complete search history.

(56) References Cited

U.S. PATENT DOCUMENTS

| | | | | |
|---|---|---|---|---|
| 4,931,982 | A * | 6/1990 | Hayashida | G05D 5/03 425/141 |
| 5,891,383 | A * | 4/1999 | Joseph | B29C 48/92 700/196 |
| 2002/0076459 | A1 * | 6/2002 | Joseph | B29C 48/92 425/141 |
| 2003/0014147 | A1 * | 1/2003 | Ignagni | D21G 9/0054 702/127 |
| 2004/0015260 | A1 * | 1/2004 | Joseph | B29C 48/903 348/E7.071 |
| 2008/0061460 | A1 * | 3/2008 | Zimmermann | B29C 55/28 425/141 |
| 2011/0112677 | A1 * | 5/2011 | Franklin | B29C 48/92 700/103 |
| 2014/0370255 | A1 * | 12/2014 | Baik | B32B 27/30 264/510 |
| 2015/0376450 | A1 * | 12/2015 | Beyer | C08J 7/043 264/129 |
| 2018/0126616 | A1 | 5/2018 | Ponsiani | |

FOREIGN PATENT DOCUMENTS

| | | |
|---|---|---|
| IT | MI20071963 A1 | 4/2009 |
| JP | H09-225995 A | 9/1997 |
| TW | 201042295 A | 12/2010 |
| WO | 2016/189518 A2 | 12/2016 |

OTHER PUBLICATIONS

Preliminary Search Report dated Jul. 27, 2020 from INPI issued in French Patent Application No. FR 1913386, 2 pages.

PCT Int'l Search Report and Written Opinion mailed Feb. 3, 2021 from the EPO issued in Application No. PCT/EP2020/081488, 12 pages.

1st Office Action dated Sep. 6, 2021 from the TIPLO issued in Taiwanese Patent Application No. 109139929, 4 pages.

* cited by examiner

TAB1

| Col.1 | Col.2 | Col.3 | Col.4 | Col.5 | Col.6 | Col.7 | Col.8 |
|---|---|---|---|---|---|---|---|
| 0 | $CT_0$ | $\alpha_0$ | $\alpha_0^{\Gamma}$ | $\alpha_0^{sup}$ | $\alpha_0^{inf}$ | $w_0^{sup}$ | $w_0^{inf}$ |
| 1 | $CT_1$ | $\alpha_1$ | $\alpha_1^{\Gamma}$ | $\alpha_1^{sup}$ | $\alpha_1^{inf}$ | $w_1^{sup}$ | $w_1^{inf}$ |
| 2 | $CT_2$ | $\alpha_2$ | $\alpha_2^{\Gamma}$ | $\alpha_2^{sup}$ | $\alpha_2^{inf}$ | $w_2^{sup}$ | $w_2^{inf}$ |
| ⋮ | | | | | | | |
| i-1 | $CT_{i-1}$ | $\alpha_{i-1}$ | $\alpha_{i-1}^{\Gamma}$ | $\alpha_{i-1}^{sup}$ | $\alpha_{i-1}^{inf}$ | $w_{i-1}^{sup}$ | $w_{i-1}^{inf}$ |
| i | $CT_i$ | $\alpha_i$ | $\alpha_i^{\Gamma}$ | $\alpha_i^{sup}$ | $\alpha_i^{inf}$ | $w_i^{sup}$ | $w_i^{inf}$ |
| i+1 | $CT_{i+1}$ | $\alpha_{i+1}$ | $\alpha_{i+2}^{\Gamma}$ | $\alpha_{i+2}^{sup}$ | $\alpha_{i+1}^{inf}$ | $w_{i+1}^{sup}$ | $w_{i+1}^{inf}$ |
| ⋮ | | | | | | | |
| n-1 | $CT_{n-1}$ | $\alpha_{n-1}$ | $\alpha_{n-1}^{\Gamma}$ | $\alpha_{n-1}^{sup}$ | $\alpha_{n-1}^{inf}$ | $w_{n-1}^{sup}$ | $w_{n-1}^{inf}$ |

Fig. 3A

TAB2

| Col.1 | Col.2 |
|---|---|
| 0 | $\underline{x}_k(0)$ |
| 1 | $\underline{x}_k(1)$ |
| 2 | $\underline{x}_k(2)$ |
| ⋮ | |
| j-1 | $\underline{x}_k(j-1)$ |
| j | $\underline{x}_k(j)$ |
| j+1 | $\underline{x}_k(j+1)$ |
| ⋮ | |
| m-1 | $\underline{x}_k(m-1)$ |

Fig. 3B

METHOD FOR MANUFACTURING A BLOWN FILM WITH DETERMINATION OF THE PROFILE OF A CHARACTERISTIC PROPERTY OF THE FILM

CROSS REFERENCE TO RELATED APPLICATIONS

This application is the U.S. National Stage of PCT/EP2020/081488 filed on Nov. 9, 2020, which application claims priority under 35 USC § 119 to French Patent Application No. 1913386 filed on Nov. 28, 2019. Both of these applications are hereby incorporated by reference in their entirety.

TECHNICAL FIELD

The invention relates to a method of manufacturing a blown film, the method including measuring a profile of a characteristic property of the film while it is being manufactured.

PRIOR ART

Blown films are tubular films produced by extruding plastics material through an annular die or "extruder ring".

At the outlet of the die, air is blown from the center of the die, putting the tube under pressure and stretching it, the tube then forming a bubble that is subsequently collapsed or "flattened" by being folded by means of a collapsing panel in such a manner as to obtain a two-layer structure of mean thickness that is twice the thickness of the wall of the bubble, the film then being rolled up to form a roll.

In order to prevent a thickness defect that is starting to form at the outlet of the die from then, while the expansion is taking place, finding itself accumulated at a given transverse position in the roll, a rotation-generating member, such as the annular die or the collapsing panel, follows a rotating movement and imposes that rotation on the folding position of the film that is identified by a "folding angle" so that the thickness defect is distributed uniformly over the roll.

The rotation can be continuous rotation or an alternating rotation (rotation in one direction and then in the other, cyclically).

It remains, however, necessary to monitor and control the thickness of the film in order to characterize the resulting film and, whenever necessary, so as to be able to act on the method of manufacturing the film.

In practice, it is difficult to measure the thickness of the blown film accurately at the bubble, since the geometrical shape of the system makes it impossible to measure the thickness by transmission because an element of the sensor would then have to be situated inside the bubble, and since backscattering measurement solutions are inaccurate.

Therefore, methods of estimating the thickness of the film after the bubble has been flattened, i.e. collapsed, have been developed, such methods being based on measuring the thickness of the bubble after it has been flattened.

Thus, Patent Application US 2011/0112677 discloses a method of measuring the thickness profile of a blown film. In that method, longitudinal sections of the film are identified on the bubble, the sums of the thicknesses of pairs of longitudinal sections that are mutually juxtaposed by the film being flattened are measured, and then advantage is taken of the rotation of the die to reconstruct a thickness profile of the film over the entire circumference of the bubble.

The die rotating makes the measurement of the thickness of the flattened film at different times correspond to sums of thicknesses of different combinations of the longitudinal sections, thereby making it possible to establish a system of linear equations that it suffices to solve to determine a thickness profile of the film over its circumference.

However, that type of method, based on a system of "buckets" or a list of profile sections, leads to uncertainty as regards the degree of overlapping of the sections, to smoothing of the thickness profile due to the film being divided up into longitudinal sections, and to resolution of the profile that is insufficient due to the averaging of the thicknesses measured on each of the sections, and, in addition, leads to a non-negligible proportion of profile measurements not being used in order to avoid the measurement artifacts due to the joins between the sections situated at the edges of the film.

SUMMARY OF THE INVENTION

An object of the invention is to improve estimating a profile of a characteristic property of a blown film, in particular as regards the resolution of the measurement and its noise level, and thereby to be able to effect improved monitoring and control over the method of manufacturing said film.

To this end, the invention provides a method of manufacturing a blown film by means of film-forming equipment, which method comprises a step of forming a blown film by extrusion through a die, a step of flattening the blown film at a folding angle that varies by drive from a rotation-generating member, a step of measuring a transverse profile of a characteristic extensive property of the blown film, which property is summed over two juxtaposed portions of a wall of the flattened blown film, a step of estimating a discretized polar profile of said characteristic extensive property of the blown film on the basis of the transverse profile, and a step of controlling the film-forming equipment in response to the estimation of the discretized polar profile of the blown film, wherein, for each measurement point at which the transverse profile is measured, in the measurement system, the method further comprises:

acquiring an angular position of the rotation-generating member;

on the basis of this angular position, and for a transverse position of the measurement point in question, determining two polar positions of the periphery of the flattened blown film that are situated at said transverse position;

for each of the two polar positions, determining two discretized angle values flanking the polar position in question; and based on said discretized angle values, computing interpolation coefficients that associate a polar profile of the film with said discretized polar profile of the film; and
wherein the method further comprises:

on the basis of said interpolation coefficients, determining an observation matrix of a main Kalman filter; and updating the estimation of the discretized polar profile of the film by means of said main Kalman filter, the transverse profile acquired in the measurement step being input into said main Kalman filter.

The method of manufacturing a blown film of the invention further comprises determining and updating a polar profile of a characteristic property of the film on the basis of transverse profiles of said characteristic property, which profiles are measured in succession on the flattened blown film.

This method makes it possible for a feedback control loop for controlling formation of the film to have high reactivity, based on robust determination of an estimated profile with high resolution and excellent reliability.

The manufacturing method of the invention may have the following features:

for a first iteration of the main Kalman filter, the method may further comprise initializing the discretized polar profile by a flat profile having a constant value equal to one half of said characteristic extensive property as summed and averaged over a first measured transverse profile;

for a first iteration of the main Kalman filter, the method may further comprise initializing the discretized polar profile by a profile of components, each of which is defined as one half of a value of a first measured transverse profile that is measured at a transverse position that is the closest to a discrete polar position of the component in question;

in response to the updating of the estimation of the discretized polar profile of the film, the method may further comprise controlling actuators for regulating formation of the blown film;

the rotation may be an alternating rotation whereby the rotation takes place in opposite directions in alternation, and the method may further comprise: estimating two discretized polar profiles of the characteristic extensive property of the blown film in parallel on the basis of a plurality of transverse profiles of the characteristic extensive property acquired by measurements on the blown film, one discretized polar profile for each rotation direction, by using two auxiliary Kalman filters, each of which is dedicated to one of the two polar profiles, using the above method; computing a cross-correlation curve representing cross-correlation of said two polar profiles; determining a position for the maximum of said cross-correlation curve and then halving said position to obtain a correction angular shift; and determining the updating of the estimation of the discretized polar profile of the film by feeding said main Kalman filter with the corrected transverse profile; and said characteristic extensive property is a thickness, said polar profile being a polar profile of the thickness of the film and said discretized polar profile being a discretized polar profile of the thickness of the film.

BRIEF DESCRIPTION OF THE DRAWINGS

The present invention can be better understood and other advantages appear on reading the following detailed description of an implementation given by way of non-limiting example and with reference to the accompanying drawings, in which:

FIG. 3A shows a table of values that is used for determining a polar profile of the thickness of the film of FIG. 1;

FIG. 3B is a table defining the polar profile of the film of FIG. 1;

DESCRIPTION OF A FIRST IMPLEMENTATION OF THE METHOD OF THE INVENTION

In this first implementation, consideration is given to a method of manufacturing a blown film by means of a continuously rotating die, i.e. a die rotating continuously in the same direction, during which method a characteristic extensive or "additive" property, namely thickness in this example, of the blown film is monitored and controlled.

A first part of the description below describes a system for collecting data that are used in implementing the method of determining a polar profile of the blown film.

In this example, the polar profile associates a thickness of the blown film with each point of its periphery, each point being identified by its polar position.

Figure 1:
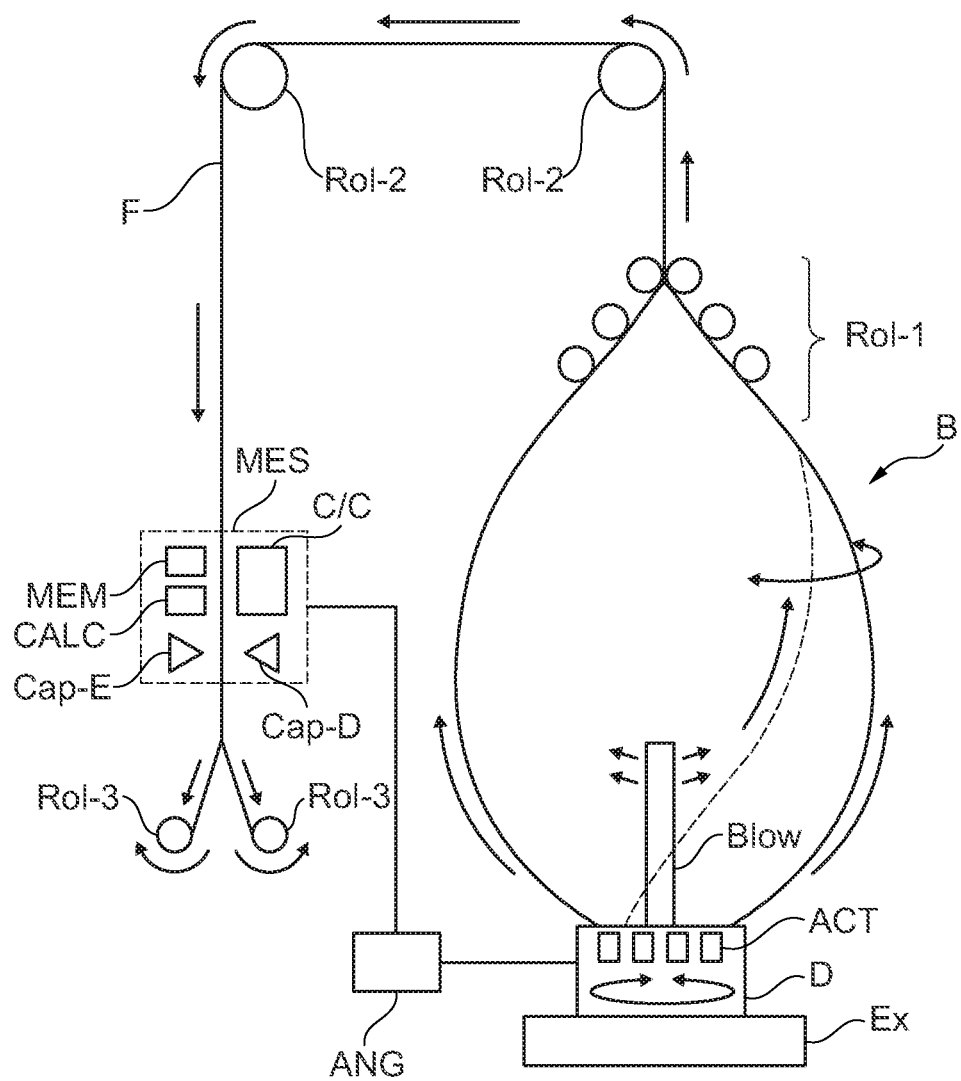
FIG. 1 shows a method of forming a blown film and of folding it, i.e. collapsing it.

FIG. 1 shows a method of forming a blown film, in which method a tubular blown film F is formed by means of an extruder Ex by being extruded through a die D that is rotating alternately in opposite directions or continuously in the same direction, and that is equipped with a blower device Blow that is blowing air under pressure into the film, thereby forming a bubble B.

In this example, the extrusion of the polymer forming the film is performed by thrust between a stationary lip and an adjustable lip of the die, the thickness of the extruded film being controllable by actuators ACT distributed along the adjustable lip, around the periphery of the die, the action of which actuators is adjustable individually.

Other methods of controlling the thickness of the film exist, based on other actuators for regulating the thickness of the blown film, such as actuators for controlling a ring of air, the flow rate or the temperature of which are caused to vary, and actuators for controlling panels for heating the blown film by infrared radiation.

Above the die, rollers Rol-1 flatten, i.e. collapse, the film, and rollers Rol-2 drive and redirect the flattened film in such a manner that it passes between a radiation emission device Cap-E and a radiation detection device Cap-D, these two devices constituting a thickness sensor Cap that preferably operates by transmission and measures a characteristic extensive property of the film.

This extensive property could be the mass per unit area or "area density" of the film as a whole, the area density of a component of the film or the area density of a layer that is part of the film when the film is a multi-layer film.

In this implementation, the characteristic property in question is the thickness of the wall of the blown film, as deduced from the area density of the film as a whole.

Below, the term "single thickness" of the film is used to mean the thickness of a single wall of the film, and the term "summed thickness" is used to mean the sum of the thicknesses of the two portions of the wall of the flattened film that are mutually juxtaposed by the flattening.

The thickness sensor is designed to measure a transverse profile of the summed thickness of the film and may be based on detecting the area density by X-ray transmission through the flattened film.

Alternatively, the thickness sensor could be based on transmission or backscattering of beta radiation.

In a general manner, the thickness measurements may be taken in transmission or in backscattering of electromagnetic rays, or of ultrasound, or of particles, but detection by transmission is preferable for reasons of measurement accuracy.

The thickness sensor is integrated into a measurement system MES that includes a computer CALC, a computer memory MEM, and a scanner (not shown) capable of scanning the thickness sensor over the width of the collapsed film on being instructed to do so by a monitoring and control system C/C.

The monitoring and control system C/C is also in functional communication with the computer CALC, and is configured to monitor and control the film-manufacturing system that includes the blower device, the die, and the actuators.

The measurement system MES is in communication with an angle indicator ANG, designed to transmit to it, at each instant, an angular position of the die as said die is rotating, in such a manner that the measurement system is capable of acquiring said angular position.

The rotation of the die causes the folding position of the film to rotate, the rotating die acting as a rotation-generating member in this example.

If the rotation of the folding position of the film were caused by a collapsing panel, the angular position would be the angular position of the panel as said panel is rotating.

Downstream from the measurement system, the film is cut into two halves that are rolled up about respective ones of two rolling-up rollers Rol-3.

Figure 2A:
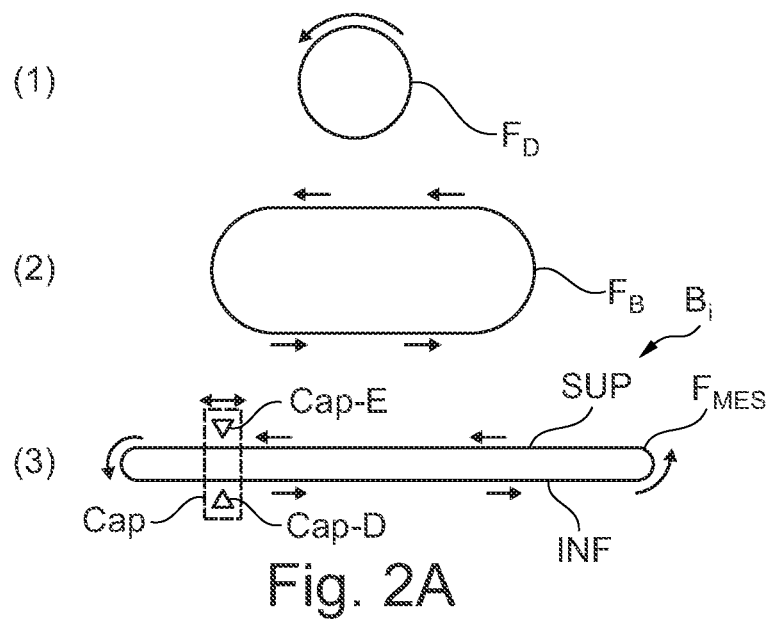
FIG. 2A shows sections of the film at various levels of FIG. 1 in the same plane.

FIG. 2A shows: at (1) a section $F_D$ of the film as it is exiting from the die D; at (2) a section $F_B$ of the film at a partially flattened section of the bubble B; and at (3) a section $F_{MES}$ of the film at the measurement system MES.

In practice, at (3), two facing portions of the blown film come into contact with each other, optionally separated by a thin layer of residual air, thereby forming a two-layer structure Bi.

For reasons of clarity, these portions are shown separated from each other in the figure.

The movement in rotation of the die propagates to the entire film as far as to the rolling-up rollers, including the portion passing through the measurement system.

In accordance with the invention, while the bubble is forming and under the monitoring and control of the monitoring and control device C/C, the measurement system scans the thickness sensor transversely over the width of the flattened film, and successively records transverse profiles of the thickness of the two-layer structure Bi formed by the flattened film in the computer memory MEM, the summed thickness $CT_i$ as measured at a point of a current transverse profile identified by an index i being stored in row i of a second column of a table in which the first column indicates the index 1.

In parallel, for each thickness measurement of the two-layer structure at a point i of the current transverse profile, the angle detector records, in row i of a third column of the table, an angular position $\alpha_i$ of the die at the instant of the thickness measurement of the two-layer structure at a point i of said current transverse profile.

Figure 2B:
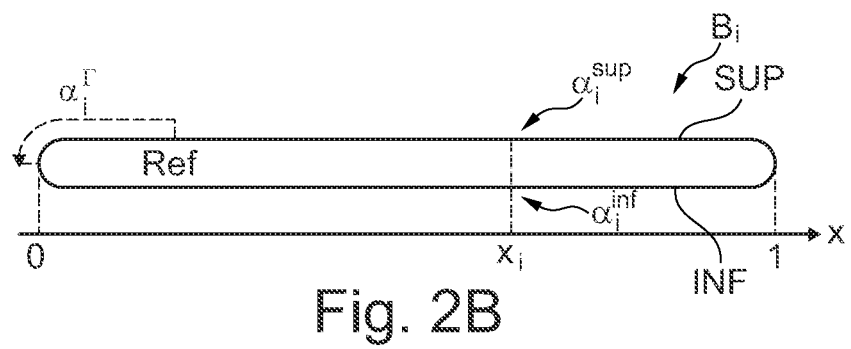
FIG. 2B shows the identification of the positions of the collapsed film of FIG. 1.

FIG. 2B shows the folding angular position $\alpha_i^\Gamma$, which corresponds to the angle between a reference angular position Ref of the die and a folding point of the bubble, the position 0° being defined by an exact correspondence between the reference position and the folding point of the bubble in the absence of rotation.

The folding angular position $\alpha_i^\Gamma$ is deduced from the angular position $\alpha_i$ of the die while taking into account the time delay corresponding to the time required for transferring the film from the die to the measurement device, and the deformation of the bubble due to its inertia, and is then stored in a fourth column of the table.

These parameters may be measured and/or estimated on the basis of the operating parameters of the production line used to implement the method.

In practice, when continuous rotation is used in which the rotation direction is constant, the angular shift $\alpha_{shift}$ generated by the above-mentioned time delay and by the rotation of the die is subtracted from the angular position $\alpha_i$ to obtain the folding angular position $\alpha_i^\Gamma$.

When alternating rotation is used in which the direction of rotation changes periodically, the angular shift $\alpha_{shift}$ is added or subtracted, depending on the direction of rotation at the time of the measurement, in such a manner as to compensate for the time delay.

FIG. 2B also shows the identification of a position on the film at the measurement system MES, with a transverse position of the collapsed film identified by a normalized x coordinate lying in the range 0 to 1, these extreme values corresponding to the folded-over edges of the flattened film.

FIG. 3A shows the recording of the thickness and angle data for n measurement points, in a table TAB1 in which the rows are identified by an index i indicated in the first column Col.1, the second column Col. 2 indicating the measured values of the thickness of the two-layer structure Bi, the third column Col. 3 indicating the angular positions of the die at the time the thickness measurement is taken, and the fourth Col. 4 indicating the angular positions of the film at the times of the respective thickness measurements at the thickness sensor.

A second part of the description follows, explaining how relationships are established between the single thicknesses of the blown film at each angular position of the film and the measurements of the summed thickness of the film at each transverse position of the flattened film.

Each transverse position x of the flattened film corresponds to two polar positions $\alpha^{sup}$ and $\alpha^{inf}$ of the periphery of the tubular film, respectively in an upper layer SUP and in a lower layer INF of the collapsed film, mutually juxtaposed by the flattening of the film, as shown by FIG. 2B.

These two polar positions $\alpha^{sup}$ and $\alpha^{inf}$ are expressed in angles lying in the range 0° to 360°, as a function of the corresponding transverse position x and of the folding angular position $\alpha\Gamma$, as defined in respective ones of the equations (Eq.1) and (Eq.2).

$$\alpha^{sup} = x \times 180° - \alpha^\Gamma (\text{modulo } 360°) \quad (\text{Eq. 1})$$

$$\alpha^{inf} = (2-x) \times 180° - \alpha^\Gamma (\text{modulo } 360°) \quad (\text{Eq.2})$$

It is possible to express a summed thickness of the film at a transverse position x by the sum of two single thicknesses of the two corresponding polar positions $\alpha^{sup}$ and $\alpha^{inf}$ by means of the equation (Eq.3).

$$\text{flatpf}(x) = \text{polpf}(\alpha^{sup}) + \text{polpf}(\alpha^{inf}) \quad (\text{Eq.3})$$

where the function polpf associates the single thickness of the blown film with each polar position of said film, and the function flatpf associates a measurement of the summed thickness of the film with each transverse position of the flattened film.

In order to establish a system of linear equations that, when solved, make it possible to go from the measured summed thicknesses to the desired single thicknesses, the functions flatpf and polpf are discretized.

Use is made of a number m of polar positions identified by an integer index j lying in the range 0 to m−1.

For example, if m is set at 500, a thickness polar profile is obtained over 360° of 0.72° of angular resolution Δa, each discrete angle being equal to the product of its index j multiplied by Δα.

Thus, there are m=500 POLPF[j]=polpf($\alpha_j$) relationships where a discrete polar position $\alpha_j$ is equal to j×Δα and the angular resolution Δα is equal to 360°/m, with POLPF representing a discretization of the function polpf over m points.

During the measurement of the summed thickness of the flattened film by means of the measurement system, uniform sampling FLATPF of the function flatpf at n measurement points is obtained.

The sizes of the discretizations POLPF and FLATPF are defined respectively by m and by n.

FLATPF can be seen by means of columns Col.1 and Col.2 of Table TAB1 of FIG. 3A, indicating respectively the index i and the summed thickness $CT_1$ corresponding to each measurement point.

If n is set, for example, at 2500, there are n=2500 FLATPF[i]=flatpf($x_i$) relationships where a discrete normalized transverse position $x_i$ is equal to i×Δx and Δx is equal to 1/n, the integer index i varying from 0 to (n−1), indicating the measurement points.

It should be noted that the number n of values of the sampling of flatpf may be much greater than the number m of the sampling of polpf, thereby guaranteeing greater accuracy and better reliability in determining the polar profile, e.g. in the range 2 times greater to 10 times greater, and preferably in the range 4 times greater to 8 times greater.

In order to convert the relationship between the functions polpf and flatpf into a relationship between the discretizations POLPF and FLATPF, for each point i of measurement of a normalized transverse position $x_i$, a relationship is established for approximation of the value of polpf at the corresponding polar position $\alpha_i^{sup}$ on the basis of the adjacent discrete polar positions $\alpha(p_i)$ and $\alpha(p_i+1)$ between which said value for $\alpha_i^{sup}$ is situated.

In the same way, an approximation of the value of polpf is performed at the corresponding polar position $\alpha_i^{inf}$ as a function of the adjacent polar positions $\alpha(q_i)$ and $\alpha(q_i+1)$ between which said value for $\alpha_i^{inf}$ is situated.

The indices $p_i$ and $q_i$ are integers lying in the range to (m−1) that associate the two immediately lower discrete angles with the angular positions $\alpha_i^{sup}$ and $\alpha_i^{inf}$ by respective ones of the relationships $p_i$×Δα and $q_i$×Δα.

Figure 2C:
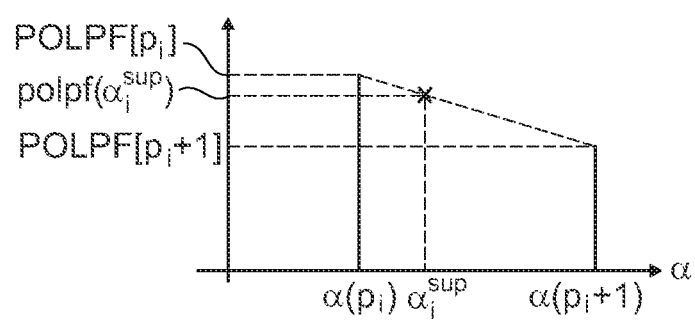
FIG. 2C shows an interpolation of a point of a polar profile of the film of FIG. 1 in the context of a discretization.

Thus, for a polar position $\alpha_i^{sup}$ corresponding to a transverse position $x_i$, consideration is given to an approximation of polpf($\alpha_i^{sup}$) on the basis of POLPF[$p_i$] and POLPF[$p_i$+1], where $p_i$ identifies the discrete angle $\alpha(p_i)$ immediately lower than $\alpha_i^{sup}$, as shown in FIG. 2C.

For example, the polar position $\alpha_i^{sup}$ equal to 1.22° lies in the range of the adjacent discrete angular values extending from 0.72° to 1.44°, where p is equal to 1 and m is equal to 500.

The method proceeds in the same way for the polar position $\alpha_i^{inf}$.

In this implementation, the approximations are performed by a first-order linear approximation according to the following equations (Eq.4) and (Eq.5):

polpf($\alpha_i^{sup}$)=$w_i^{sup}$×POLPF[$p_i$]+(1−$w_i^{sup}$)×POLPF[$p_i$+1]     (Eq. 4)

polpf($\alpha_i^{inf}$)=$w_i^{inf}$×POLPF[$q_i$]+(1−$w_i^{inf}$)×POLPF[$q_i$+1]     (Eq. 5)

where the coefficients $w_i^{sup}$ and $w_i^{inf}$ represent the respective relative weights of POLPF[$p_i$] and POLPF[$q_i$], and are expressed by respective ones of following the equations (Eq.6) and (Eq.7):

$$w_i^{sup} = i - \frac{\alpha_i^{sup}}{\Delta\alpha} + 1 \quad \text{(Eq. 6)}$$

$$w_i^{inf} = i - \frac{\alpha_i^{inf}}{\Delta\alpha} + 1 \quad \text{(Eq. 7)}$$

When $p_i$ and/or $q_i$ take the value (m−1), the value 0 is assigned respectively to ($p_i$+1) and/or to ($q_i$+1).

In this example, the approximation is a first-order linear interpolation, but some other type of approximation could be used, so long as the single thicknesses of the film at the polar positions $\alpha_i^{sup}$ and $\alpha_i^{inf}$ are expressed as a function of the single thicknesses of the film at the discretized polar positions.

From the preceding equations, the equation (Eq.8) is drawn that associates the POLPF discretization and the FLATPF discretization by means of a system of n linear equations.

FLATPF[i]=$w_i^{sup}$×POLPF[$p_i$]+(1−$w_i^{sup}$)×POLPF[$p_i$+1]+$w_i^{inf}$×POLPF[$q_i$]+(1−$w_i^{inf}$)×POLPF[$q_i$+1]     (Eq.8)

This method of associating the desired single thicknesses with the measured summed thicknesses offers various advantages.

Firstly, it makes it possible to take into account any form of movement of the die, as well as the variation in the folding angle of the film during scanning of the thickness sensor over a width of the film, whenever it is possible to determine accurately the path of a point of said film between the die and the measurement system.

Then, unlike the methods based on a list of profile sections, it is possible to generate as many equations as there are measurement points, independently of the number of discretization points chosen for the polar profile and thus independently of its resolution, without any risk of overlap error between the sections.

This method makes it possible, in addition, to define equations over a subset of FLATPF, e.g. by excluding a measurement zone that is of low quality due to excessive noise that might distort the results.

A third part of the description follows, describing in detail application of a Kalman filter to determining the polar profile of the blown film.

In a general manner, such a filter hones an estimation of the hidden state of a dynamic linear system iteratively at each new observation of the system, brought in the form of measurements of said system, and is thus based on a combination of modeling the variation of the system and of modeling the observation of said system.

In the formalism of a Kalman filter applied to the method of the invention, expressed in the form of a matrix computation, the vector of the hidden state $\underline{x}_k$ of the system is the desired polar profile corresponding to POLPF, and the observation vector $\underline{y}_k$ of the system represents the measured transverse profile corresponding to FLATPF, at an observation iteration k, these two vectors being expressed by means of respective ones of the two general state equations (Eq.9) and (Eq.10).

The vectors $\underline{x}_k$ and $\underline{y}_k$ thus have sizes equal to the sizes of POLPF and FLATPF, i.e. m and n, respectively.

The equation (Eq.9) models the variation in the hidden state of the system:

$$\underline{x}_{k+1} = F_k \cdot \underline{x}_k + \Gamma_k \cdot \underline{u}_k + G_k \cdot \underline{w}_k \quad (Eq.9)$$

where $F_k$ is a matrix that represents modeling of the spontaneous variation in the hidden state of the system, $\underline{u}_k$ is the profile of known actions on the film thickness regulation systems of the production line, $\Gamma_k$ is the matrix of influence of the zones of the regulation system on the polar profile, $\underline{w}_k$ is the unknown vector of the unanticipated variations in the hidden state, and $G_k$ is the matrix of the impact of the unanticipated variations on the hidden state of the system.

The equation (Eq.10) models the observation of the system:

$$\underline{y}_k = H_k \cdot \underline{x}_k + D_k \cdot \underline{u}_k + \underline{v}_k \quad (Eq.10)$$

where $H_k$ is an "observation" matrix that associates the hidden state $\underline{x}_k$ with the observation $\underline{y}_k$, $D_k$ is a matrix that represents the influence of the actions on the observation, and $\underline{v}_k$ is a vector that represents noise of measurement of characteristics that are known for the measurement instrument and the transient variations in the polar profile.

In accordance with the invention, the system in question is the equipment for manufacturing and characterizing the blown film, as well as the blown film itself.

In this context, the properties generically described above are adapted to the blown film production method, as explained below for this implementation.

The hidden state $\underline{x}_k$ is a desired vector of size m, each coordinate of which expresses the single thickness of the tubular film at a given polar position of the polar profile, and represents the function polpf.

In the context of this implementation, the hidden state $\underline{x}_k$ can be reduced to the POLPF discretization.

The matrix $F_k$ is the identity I matrix because the polar profile of the bubble is considered to be stable over time, i.e. to be preserved identically from one iteration to the other in the absence of disturbance or interference.

The vector $\underline{u}_k$ represents the actions on the actuators of the production line (die regulators such as heater bolts, ring of air, and infrared panels) and its size corresponds to the number of actuators taken into account, e.g. the number of actuators over the periphery of the tubular film; for example, $\underline{u}_k$ is a vector of size 30 if the bubble is regulated at 30 zones over its circumference, each zone receiving an actuator.

Each co-ordinate of this vector may, for example, represent a percentage of opening of the blower nozzles distributed around a ring of air.

The matrix $\Gamma_k$ represents the influence of the actuator zones on the polar profile, i.e. a matrix of construction that combines the effects of the mutual influence of the actuators (proximity of action) with the effect of under-sampling that the actuators have relative to the points of the polar profile.

The elements making up this matrix may, for example, be determined experimentally, expressing the variation in the single thickness of the film at a given point of the polar profile in response to a percentage of opening applied to a given actuator when said actuator is a blower nozzle.

The vector $\underline{w}_k$ is a random vector, e.g. centered white noise.

The matrix $G_k$ is simplified in the method at the identity I.

The observation $\underline{y}_k$ is a vector of size n, each coordinate of which expresses the measured thickness of the two-layer structure at a given transverse position of the flattened film, and represents the function flatpf.

In the context of this implementation, the observation $\underline{y}_k$ can be reduced to the FLATPF discretization.

The matrix $H_k$ is a matrix of size m×n representing the system of linear equations of the equation (Eq.8), expressing FLATPF as a function of POLPF.

The vector $\underline{v}_k$ is a random vector, e.g. centered white noise.

Thus, in this implementation of the invention, the state equations (Eq.9) and (Eq.10) of the system can be simplified into state equations (Eq.11) and (Eq.12), respectively.

$$\underline{x}_{k+1} = \underline{x}_k + \Gamma_k \cdot \underline{u}_k \underline{w}_k \quad (Eq.11)$$

$$\underline{y}_k = H_k \cdot \underline{x}_k + \underline{v}_k \quad (Eq.12)$$

Applying the Kalman filter to the state equations (Eq.11) and (Eq.12) describing the system makes it possible to estimate the variation in said system, and thus to determine the thickness polar profile of the blown film and variation in that profile.

To this end, computations are performed for updating various properties subsequently to each profile measurement iteration: the estimation error covariance matrix $P_{k|k-1}$ of $\underline{x}_k$; the estimator $\hat{\underline{x}}_{k|k-1}$ of $x_k$ at rank k, with the information at iteration (k−1) being known; the estimator $\hat{\underline{x}}_{k|k}$ of $\underline{x}_k$ at rank k, with the information at iteration k being known; the prediction error $\hat{\varepsilon}_{k|k-1}$ being equal to $\underline{y}_k - H_k \cdot \hat{\underline{x}}_{k|k-1}$ at the iteration k, with the information at the iteration (k−1) being known, and the covariance matrix of which is $R_k^\varepsilon$.

Applying the Kalman filter to the above-defined system leads to the computation steps corresponding to respective ones of the following equations (Eq.13) to (Eq.19).

$$\hat{\underline{x}}_{k|k-1} = \vec{\underline{x}}_{k-1|k-1} + \Gamma_k \cdot \underline{u}_k \quad (Eq.13)$$

$$P_{k|k-1} = P_{k-1|k-1} + Q \quad (Eq.14)$$

$$R_k^\varepsilon = R + H_k^t \cdot P_{k|k-1} \cdot H_k \quad (Eq.15)$$

$$\hat{\varepsilon}_{k|k-1} = \underline{y}_k - H_k \cdot \hat{\underline{x}}_{k|k-1} \quad (Eq.16)$$

$$K_k^f = P_{k|k-1} \cdot H_k^t \cdot (R_k^\varepsilon)^{-1} \quad (Eq.17)$$

$$\hat{\underline{x}}_{k|k} = \hat{\underline{x}}_{k|k-1} + K_k^f \cdot \hat{\varepsilon}_{k|k-1} \quad (Eq.18)$$

$$P_{k|k} = P_{k|k-1} - R_k^f \cdot R_k^\varepsilon \cdot (K_k^f)^t \quad (Eq.19)$$

In the equation (14), Q represents the covariance matrix of the unanticipated variations $w_k$ in the polar profile, and is evaluable, e.g. by considering the variations in the profile as having white noise of constant standard deviation $\sigma_w$ making it possible to define Q as being equal to $\sigma_w^2 \cdot I_m$, where $I_m$ is the identity matrix of size m.

A typical value of $\sigma_w$ for a film having a single thickness of 10 micrometers (μm) is, for example 0.02 μm, to be modulated essentially as a function of the stability of the bubble.

In the equation (15), R represents the covariance matrix of the measurement noise $v_k$, and is evaluable, e.g. by considering the noise as white noise of constant standard deviation $\sigma_v$, making it possible to define R as being equal to $\sigma_v^2 \cdot I_n$, where $I_n$ is the identity matrix of size n.

A typical value of u for a film having a single thickness of 10 μm is, for example, 0.2 μm.

Instead of using the equation (17) and the inverse of $R_k^\varepsilon$, it may be preferred to use a solver of the equation $K_k^f \cdot R_k^\varepsilon = P_{k|k-1} \cdot H_k^t$ such a method being more economical in terms of computations.

In the equation (19), the estimation error covariance matrix $P_{k|k}$ of the covariance matrix of $\underline{x}_k$ is updated for the following iteration.

In the above-described iterative computations, the necessary initialization values are computed on the basis of the first observation $\underline{y}_0$, i.e. on the basis of a first measured transverse profile.

Thus, the vector $\underline{x}_0$ of the hidden state at the first iteration is defined as a vector of m components that are all identical, each of which is equal to one half of the mean summed thickness of the first measured transverse profile.

In other words, the single thickness profile is initialized by a flat profile having a constant thickness equal to one half of the mean summed thickness of the first measured transverse profile.

Alternatively, it is possible for the vector $\underline{x}_0$ of the hidden state at the first iteration to be defined as a vector of m components, each of which is defined as one half of a value of the first transverse profile measured at the transverse position that is closest to the corresponding discrete polar position.

Thus, in order to define each component j of the vector $\underline{x}_0$, it is possible to select, from the pairs $(w_i^{sup}; p_i)$ $(1-w_i^{sup}; p_i+1)$, $(w_i^{inf}, q_i-1)$ and $(1-w_i^{inf}, q_i+1)$ of the equation 8, that one in which the first member is the greatest for the second member having the value of j in question, and then to select the corresponding value FLATPF[i] of the first measured transverse profile, to halve it and to assign the resulting value to the component j of $\underline{x}_0$.

In addition, the covariance matrix $P_0$ of the initial estimator of the covariance of $\underline{x}_k$ is defined as the product of an identity matrix of size m multiplied by one half of the variance of the first observation $\underline{y}_0$.

This value $P_0$ is a piece of data that conditions the speed of convergence of the system, and a more accurate estimation is possible by statistically studying the starting profiles.

The first iterations of the above algorithm serve mainly to converge towards a stabilized estimation of which corresponds to a thickness profile averaged over the entire set of first measured profiles.

The determination criterion indicating that the system has converged is as follows.

The statistical standard deviation is computed over the coordinates of the residual error profile after correction $\sigma(\underline{\varepsilon}_{k|k})$ which is equal to $\sigma(\underline{y}_k - H_k \cdot \hat{\underline{x}}_{k|k})$, and then it is compared with a threshold indicating stability of the method so as to decide whether the system has converged to a correct approximation of the mean polar profile.

The threshold is determined by a human operator who takes into account the past experience of applying the Kalman filter to the system for manufacturing the blown film.

WHEN $\sigma(\underline{\varepsilon}_{k|k})$ IS LESS THAN SAID THRESHOLD, THE RESIDUAL error is considered to be due to transient variations in the time of the polar profile, which variations are generated by uncontrolled variations.

Figure 4:
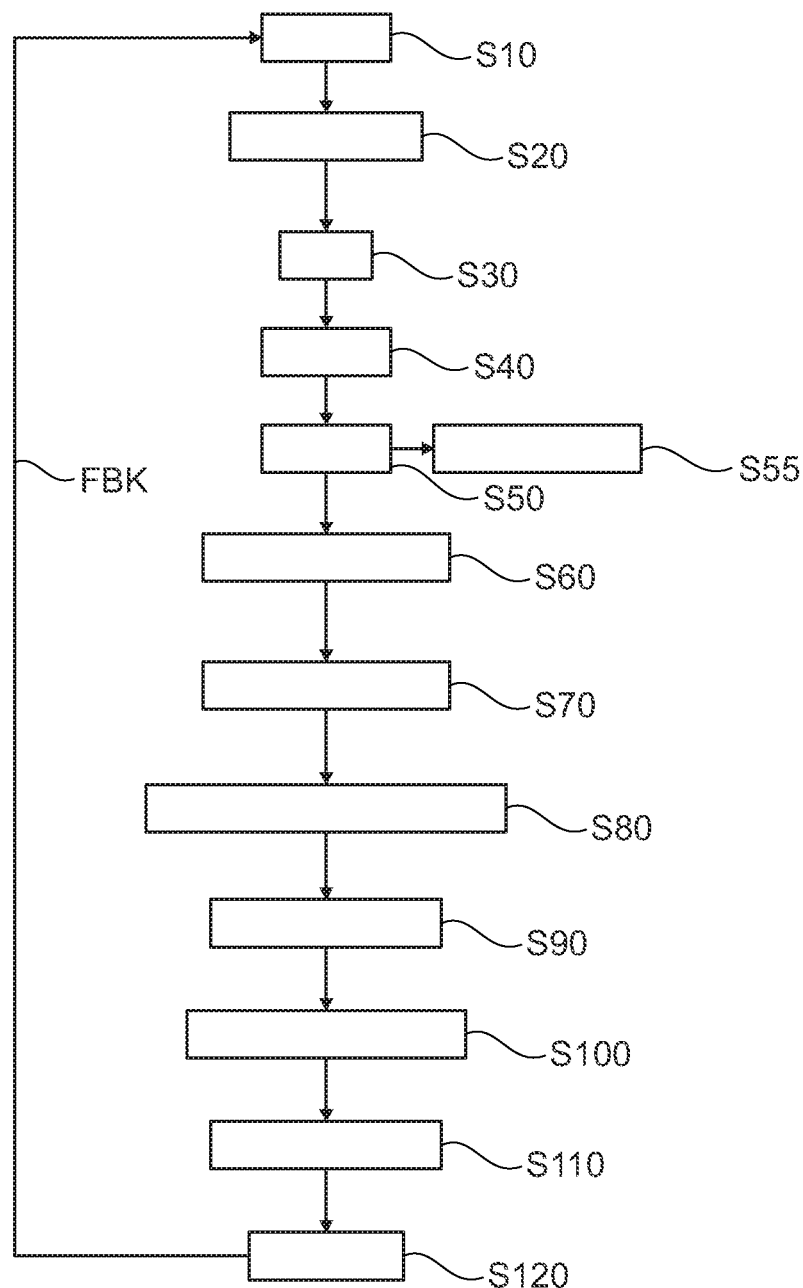
FIG. 4 is a flow chart of the method of manufacturing the film of FIG. 1 in a first implementation of the invention.

In practice, the first implementation of the manufacturing method follows the following steps, as shown in the flow chart 10 of FIG. 4 that corresponds to following a portion of the extruded film, it being understood that it is a continuous method and that each step is repeated, in parallel with the others for other portions of the film.

In a first step S10, the blown film F is formed by extruding one or more polymer materials through the die D in such a manner as to obtain a film having a tubular shape, it being possible for the film to be a single-layer or a multi-layer film.

In a second step S20, air blown under pressure by the blower device Blow into the tubular film leads to a bubble being formed, the film then being flattened, i.e. collapsed, by the rollers Rol-1 during a step S30 in such a manner as to form a two-layer structure.

In a step S40, the rollers Rol-2 drive the flattened film to the measurement system MES.

In a step S50, the measurement system MES acquires a transverse profile of the thickness of the two-layer structure Bi formed by the flattened film in its transverse direction and, simultaneously for each point i of acquisition of the thickness as identified by a normalized transverse position $x_i$, acquires an angular position $\alpha_i$ of the die as said die is rotating.

In a step S60, the computer CALC determines the folding angular position $\alpha_i^\Gamma$ on the basis of the angular position $\alpha_i$ of the rotating die.

The data obtained in steps S50 and S60 are stored in the memory MEM, and may, for example, be represented in the form of the table TAB1 of FIG. 3A.

Transverse profiles of thicknesses are acquired successively, each profile having its own table of values, and each transverse profile serving to update an estimated version of the thickness polar profile using the method of the Kalman filter.

In the particular situation of starting the operations, the Kalman filter is initialized during a step S55, on the basis of a first thickness transverse profile using the principles and data described above.

The following transverse profiles then each serve for a new iteration of the filter.

In a step S70, on the basis of the angular position $\alpha_i^\Gamma$ of the die corresponding to each point i of acquisition of the thickness profile, of transverse position $x_i$ in the film, the computer CALC determines the two polar positions $\alpha_i^{sup}$ and $\alpha_i^{inf}$ of the periphery of the tubular film.

In a step S80, the computer determines discretized angle values flanking the polar positions $\alpha_i^{sup}$ and $\alpha_i^{inf}$ for each measurement point i, and records them in the memory MEM, in the row i in respective ones of the columns Col.5 and Col.6 of the table TAB1 of FIG. 3A.

It should be noted that determining the discretized angle values is equivalent to determining the indices $p_i$ and $q_i$ identifying them, these properties being directly mutually associated by the chosen angular resolution.

In a step S90, the computer computes the coefficients $w_i^{sup}$ and $w_i^{inf}$ that, by interpolation, associate the polar profile polpf with the discretized polar profile POLPF, on the basis of the discretized angle values obtained in step S80 and on the basis of the equations (Eq.6) and (Eq.7), at each measurement point i for each of the polar positions $\alpha_i^{sup}$ and $\alpha_i^{inf}$.

The coefficients $w_i^{sup}$ and $w_i^{inf}$ are recorded $i_n$ respective ones of columns Col.7 and Col.8 in row i of the table TAB1.

In step S100, the computer determines the observation matrix $H_k$ of the Kalman filter on the basis of the system of linear equations defined by the equation (Eq.8), and that associates the polar profile of the desired single thickness with the transverse profile of the thickness of the two-layer structure formed by the flattened film as measured in step S50.

In a step S110, and by considering the computation of the Kalman filter that is already initialized, an update is computed of the estimator $\hat{x}_{k|k}$ that represents an estimation of the vector $\underline{x}_k$ and thus of the polar profile POLPF of single thickness, and an update is also computed of the estimation error covariance matrix $P_{k|k}$, these data being stored in the memory MEM.

At the end of step S110, an estimation is obtained of the polar profile POLPF represented by the vector $\underline{x}_k$ that benefits from the knowledge of the latest transverse profile obtained, which is stored in the memory MEM in the form of a table TAB2 having two columns defining the current polar profile POLPF, as shown in FIG. 3B.

A first column Col.1 of TAB2 indicates the indices j identifying the polar position in question of the polar profile.

A second column Col.2 of TAB2 indicates the single thickness of the film at this polar position of index j, this thickness having the value of the $j^{th}$ updated element $\underline{x}_k(j)$ of the vector $\underline{x}_k$.

In a step S120, the computer CALC makes a comparison between the current polar profile POLPF and a target profile $\underline{x}_{target}$ established by an operator, by computing, in this implementation, the difference between $\underline{x}_{target}$ and $\underline{x}_k$ for each of the coordinates.

In a step FBK, the monitoring and control system C/C controls the equipment for forming the film in response to said comparison, subsequent to adjustments made manually by an operator or automatically by a feedback control loop that links the monitoring and control system to the equipment for forming the film, e.g. to the actuators ACT of the die.

Controlling the actuators corresponds to the vector $\underline{u}_k$ used at the inlet of the Kalman filter.

The single thickness of the film is thus monitored and controlled at the die as a function of the polar profile estimated on the basis of measurements of the summed thickness of the flattened blown film.

Although this implementation gives a technical solution for forming a film that is based on monitoring and controlling the thickness of said film, the invention extends to monitoring and control based on any other alternative characteristic extensive property considered as relevant by the practitioner.

Description of a Second Implementation of the Method of the Invention

In this second implementation, consideration is given to a method of manufacturing a blown film by means of a die that is moving in alternating rotation, i.e. in one direction and in the opposite direction in alternation.

It is then necessary to take into account, in addition to the direction of rotation of the die, a periodic phase-shift phenomenon occurring at each change of direction of rotation of the die and until a steady state is established.

This phase shift is due to the inertia and to the deformation of the bubble, and the less the bubble is inflated the more it is deformed, the effects of the inertia of the bubble being difficult to model when a change of rotation direction takes place.

Therefore, when the die rotates in alternating rotation, it is difficult to establish accurately the value of the shift to be applied to reconstruct correctly the thickness profile at each instant.

Conversely, on the basis of the measurement of the thickness profile of a blown film as described above, it is possible to take advantage of the alternating aspect of the rotation of the die to determine precisely the shift $\alpha_{shift}$ that applies when the rotation of the bubble is in a steady-state domain.

The principle is to perform two reconstructions of thickness polar profiles in parallel, referred to as "parallel profiles", by means of two auxiliary Kalman filters and without introducing any shift: one of the parallel profiles is reconstructed on the basis of the data obtained for a positive direction of rotation of the die while the other parallel profile is reconstructed on the basis of the data obtained for a negative direction of rotation of the die.

Thus, for parallel profiles reconstructed over a time interval that is sufficiently short for large variations in profiles not to be introduced in the film, two similar polar profiles are obtained for respective ones of the positive and negative rotation directions, POLPF($+\alpha_{shift}$) and POLPF($-\alpha_{shift}$), one shifted by a shift of value $+\alpha_{shift}$ and the other by a shift of value $-\alpha_{shift}$ relative to a profile that would take these shifts into account.

Figure 5A:
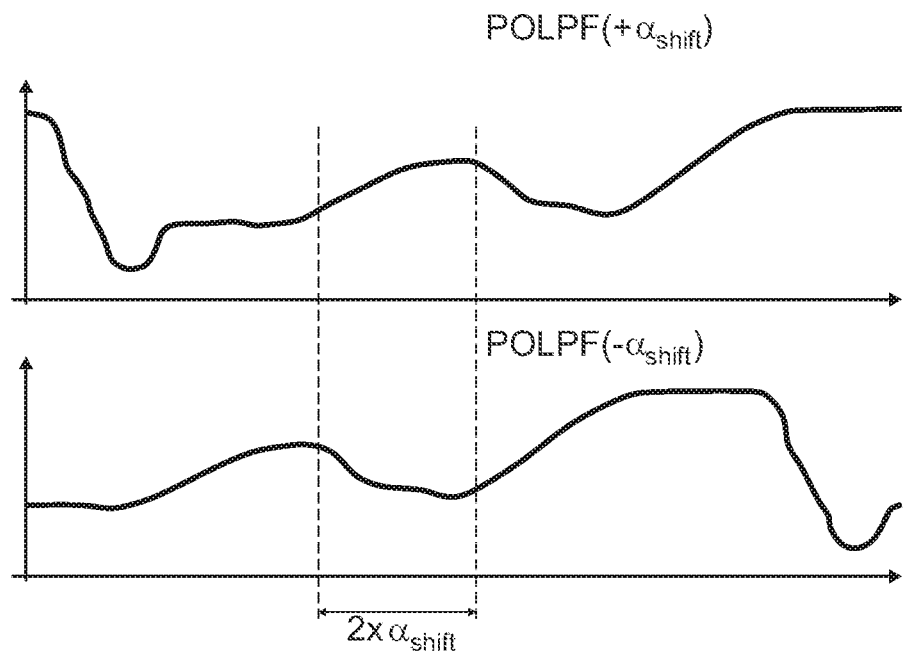
FIG. 5A shows two polar profiles of a film, each obtained for a different rotation direction of the die.

FIG. 5A shows such parallel profiles that are similar other than that they are shifted relative to each other by an angular value of $2\times\alpha_{shift}$.

Figure 5B:
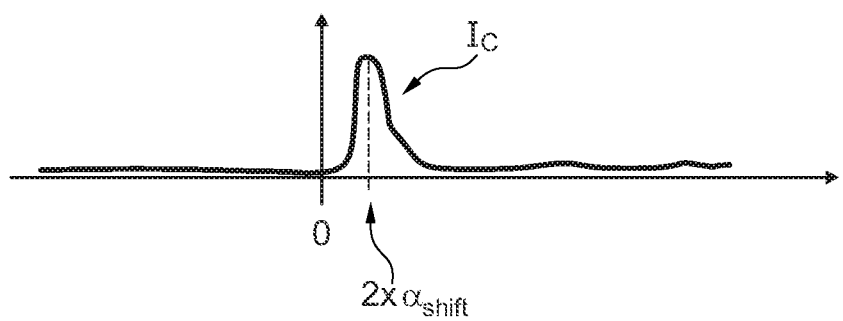
FIG. 5B shows a cross-correlation curve of the profiles of FIG. 5A.

Determining the maximum of the cross-correlation curve IC representing cross-correlation between the parallel profiles POLPF($+\alpha_{shift}$) and POLPF($-\alpha_{shift}$) of FIG. 5A, e.g. by parabolic regression, makes it possible to determine the angular shift $2\times\alpha_{shift}$ between these two profiles, as shown by FIG. 5B.

Halving this shift gives the correction angular shift $\alpha_{shift}$ that it is possible to introduce in the input data of a main Kalman filter in order to update the estimation of a polar profile in the first implementation.

Figure 6:
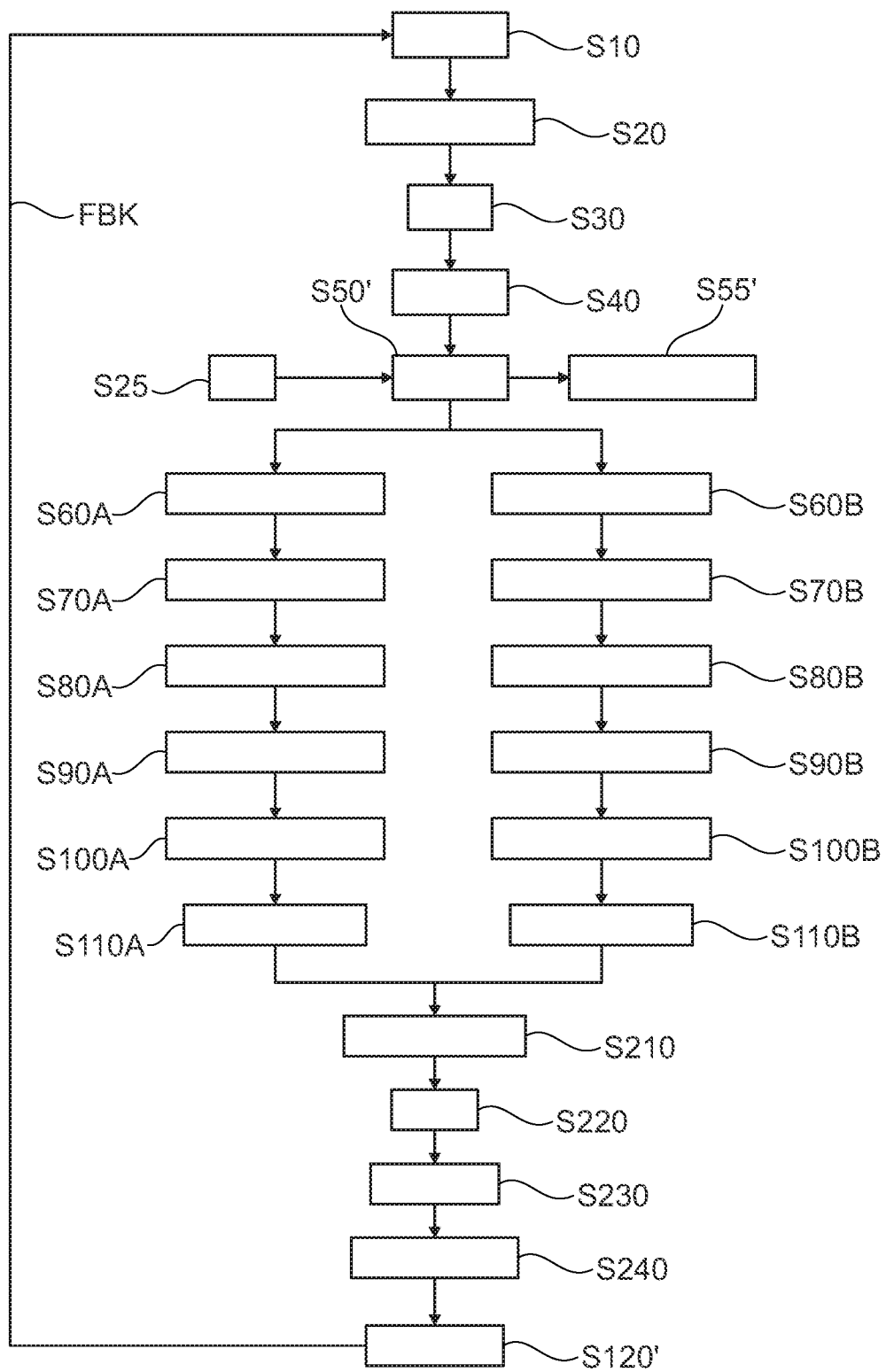
FIG. 6 is a flow chart of the method of manufacturing the film of FIG. 1 in a second implementation of the invention.

The flow chart 20 of FIG. 6 shows the second implementation of the method of manufacturing a blown film.

As regards the steps numbered in the same way as in flow chart 10, reference can be made to the first implementation.

The second implementation differs from the first implementation on the following points.

At the time of the step S50' of measuring the summed thickness profile of the flattened film, the angle indicator ANG sends, in addition to an angular position, a signal indicating the direction of rotation of the die to the measurement system MES during a step S25, thereby making it possible to determine the direction of rotation of the film.

Alternatively, if the rotation of the blown film was caused by rotation of a collapsing panel, the direction of rotation could be the direction of rotation of the collapsing panel.

Also alternatively, it is possible to determine the direction of rotation of the film (generated by the rotation of the die or of the collapsing panel) on the basis of studying the direction of scanning of the sensor and of the variation in the indicated angle.

In response to determining the direction of rotation of the film, the measurement system MES processes the data acquired in parallel using a method based on using two auxiliary Kalman filters, and comprising the steps S60B to S100A, and S60B to S100B that are respectively equivalent to the steps S60 to S100 of the first implementation.

More specifically, the transverse profiles obtained during a period of rotation of positive direction are processed separately from the transverse profiles obtained during a period of rotation of negative direction, in the steps S60A to S110A, as in the first implementation.

Similarly, the transverse profiles obtained during a period of rotation of negative direction are processed separately from the transverse profiles obtained during a period of rotation of positive direction, in the steps S60B to S110B, as in the first implementation.

Thus, two parallel polar profiles of the thickness of the film are updated alternately, without any correction related to the desired shift, and thus angularly shifted by $2 \times \alpha_{shift}$ relative to each other.

An initialization step S55' consists in initializing two distinct Kalman filters, each of which is dedicated to one of the two parallel profiles, in a manner similar to the step S55 of the first implementation.

During a step S210, the computer CALC computes the cross-correlation curve of the two parallel polar profiles.

During a step S220, the computer CALC determines the position of the maximum of said cross-correlation curve, and then halves the angular value of said position to obtain the correction angular shift $\alpha_{shift}$.

During a step S230, the computer CALC applies a correction by said correction angular shift to the current transverse profile, i.e. to the latest acquired transverse profile.

More specifically, the correction consists in applying a positive or negative shift, of amplitude equal to the correction angular shift obtained in step S220, to the folding angle of the thickness acquisition point of step S50 for the current transverse profile: the folding angle of a point of the film of which the thickness is obtained during a rotation of positive direction is shifted by $-\alpha_{shift}$ while the folding angle of a point of the film of which the thickness is obtained during a rotation of negative direction is shifted by $+\alpha_{shift}$.

The correction may be applied to the angular position of the rotation-generating member before determining the folding angle on the basis of said corrected position, or indeed directly to the folding angle.

During a step S240, the computer CALC feeds a main Kalman filter with the transverse profiles of corrected angular positions, with the transverse profiles obtained during a rotation of negative direction, and with the transverse profiles obtained during a rotation of positive direction, except for the profiles containing a reversal of rotation, in such a manner as to obtain a main polar profile of the thickness of the film, using the steps S50 to S110 of the first implementation.

In a step S120', the computer CALC makes a comparison between the current main polar profile and a target profile established by an operator, in a manner similar to the comparison in step S120 of the first implementation.

In a step FBK, the monitoring and control system C/C controls the equipment for forming the film in response to said comparison, subsequent to adjustments made manually by an operator or automatically by a feedback control loop that links the monitoring and control system to the equipment for forming the film, e.g. to the actuators ACT of the die.

It should be noted that, as in the first implementation, the rotation of the folding position of the film may be generated by a collapsing panel or any other rotation-generating member, in which case the angular position to be considered is the angular position of said rotation-generating member.

Naturally, the present invention is in no way limited to the above-described implementations, which can undergo modifications without going beyond the ambit of the invention.

What is claimed is:

1. A method of manufacturing a blown film by means of film-forming equipment, which method comprises a step of forming a blown film by extrusion through a die, a step of flattening the blown film at a folding angle that varies by drive from a rotation-generating member, a step of measuring a transverse profile of a characteristic extensive property of the blown film, which property is summed over two juxtaposed portions of a wall of the flattened blown film, a step of estimating a discretized polar profile of said characteristic extensive property of the blown film on the basis of the transverse profile, and a step of controlling the film-forming equipment in response to the estimation of the discretized polar profile of the blown film, wherein for each measurement point at which the transverse profile is measured, in the measurement system, the method further comprises:

acquiring an angular position of the rotation-generating member;

on the basis of this angular position, and for a transverse position ($x_i$) of the measurement point in question, determining two polar positions of the periphery of the flattened blown film that are situated at said transverse position;

for each of the two polar positions, determining two discretized angle values flanking the polar position in question; and based on said discretized angle values, computing interpolation coefficients that associate a polar profile of the film with said discretized polar profile of the film; and in that the method further comprises:

on the basis of said interpolation coefficients, determining an observation matrix of a main Kalman filter; and updating the estimation of the discretized polar profile of the film by means of said main Kalman filter, the transverse profile acquired in the measurement step being input into said main Kalman filter.

2. The method of manufacturing a blown film according to claim 1, wherein for a first iteration of the main Kalman filter, the method further comprises initializing the discretized polar profile by a flat profile having a constant value equal to one half of said characteristic extensive property as summed and averaged over a first measured transverse profile.

3. The method of manufacturing a blown film according to claim 1, wherein for a first iteration of the main Kalman filter, the method further comprises initializing the discretized polar profile by a profile of components, each of which is defined as one half of a value of a first measured transverse profile that is measured at a transverse position that is the closest to a discrete polar position of the component in question.

4. The method of manufacturing a blown film according to claim 1, wherein in response to the updating of the estimation of the discretized polar profile of the film, the method further comprises controlling actuators for regulating formation of the blown film.

5. The method of manufacturing a blown film according to claim 4, wherein the rotation is an alternating rotation whereby the rotation takes place in opposite directions in alternation, and in that the method further comprises:

estimating two discretized polar profiles of the characteristic extensive property of the blown film in parallel on the basis of a plurality of transverse profiles of the characteristic extensive property acquired by measurements on the blown film, one discretized polar profile for each rotation direction, by using two auxiliary Kalman filters, each of which is dedicated to one of the two polar profiles;

computing a cross-correlation curve representing cross-correlation of said two polar profiles;

determining a position for the maximum of said cross-correlation curve and then halving said position to obtain a correction angular shift; and determining the updating of the estimation of the discretized polar profile of the film by feeding said main Kalman filter with the corrected transverse profile.

6. The method of manufacturing a blown film according to claim 5, wherein said characteristic extensive property is a thickness, said polar profile being a polar profile of the thickness of the film and said discretized polar profile being a discretized polar profile of the thickness of the film.

7. The method of manufacturing a blown film according to claim 1, wherein in response to the updating of the estimation of the discretized polar profile of the film, the method further comprises controlling actuators for regulating formation of the blown film.

8. The method of manufacturing a blown film according to claim 3, wherein the rotation is an alternating rotation whereby the rotation takes place in opposite directions in alternation, and in that the method further comprises:
- estimating two discretized polar profiles of the characteristic extensive property of the blown film in parallel on the basis of a plurality of transverse profiles of the characteristic extensive property acquired by measurements on the blown film, one discretized polar profile for each rotation direction, by using two auxiliary Kalman filters, each of which is dedicated to one of the two polar profiles;
- computing a cross-correlation curve representing cross-correlation of said two polar profiles;
- determining a position for the maximum of said cross-correlation curve and then halving said position to obtain a correction angular shift; and
- determining the updating of the estimation of the discretized polar profile of the film by feeding said main Kalman filter with the corrected transverse profile.

9. The method of manufacturing a blown film according to claim 2, wherein the rotation is an alternating rotation whereby the rotation takes place in opposite directions in alternation, and in that the method further comprises:
- estimating two discretized polar profiles of the characteristic extensive property of the blown film in parallel on the basis of a plurality of transverse profiles of the characteristic extensive property acquired by measurements on the blown film, one discretized polar profile for each rotation direction, by using two auxiliary Kalman filters, each of which is dedicated to one of the two polar profiles;
- computing a cross-correlation curve representing cross-correlation of said two polar profiles;
- determining a position for the maximum of said cross-correlation curve and then halving said position to obtain a correction angular shift; and
- determining the updating of the estimation of the discretized polar profile of the film by feeding said main Kalman filter with the corrected transverse profile.

10. The method of manufacturing a blown film according to claim 1, wherein the rotation is an alternating rotation whereby the rotation takes place in opposite directions in alternation, and in that the method further comprises:
- estimating two discretized polar profiles of the characteristic extensive property of the blown film in parallel on the basis of a plurality of transverse profiles of the characteristic extensive property acquired by measurements on the blown film, one discretized polar profile for each rotation direction, by using two auxiliary Kalman filters, each of which is dedicated to one of the two polar profiles;
- computing a cross-correlation curve representing cross-correlation of said two polar profiles;
- determining a position for the maximum of said cross-correlation curve and then halving said position to obtain a correction angular shift; and
- determining the updating of the estimation of the discretized polar profile of the film by feeding said main Kalman filter with the corrected transverse profile.

11. The method of manufacturing a blown film according to claim 4, wherein said characteristic extensive property is a thickness, said polar profile being a polar profile of the thickness of the film and said discretized polar profile being a discretized polar profile of the thickness of the film.

12. The method of manufacturing a blown film according to claim 3, wherein said characteristic extensive property is a thickness, said polar profile being a polar profile of the thickness of the film and said discretized polar profile being a discretized polar profile of the thickness of the film.

13. The method of manufacturing a blown film according to claim 2, wherein said characteristic extensive property is a thickness, said polar profile being a polar profile of the thickness of the film and said discretized polar profile being a discretized polar profile of the thickness of the film.

14. The method of manufacturing a blown film according to claim 1, wherein said characteristic extensive property is a thickness, said polar profile being a polar profile of the thickness of the film and said discretized polar profile being a discretized polar profile of the thickness of the film.

\* \* \* \* \*